Figure 1:
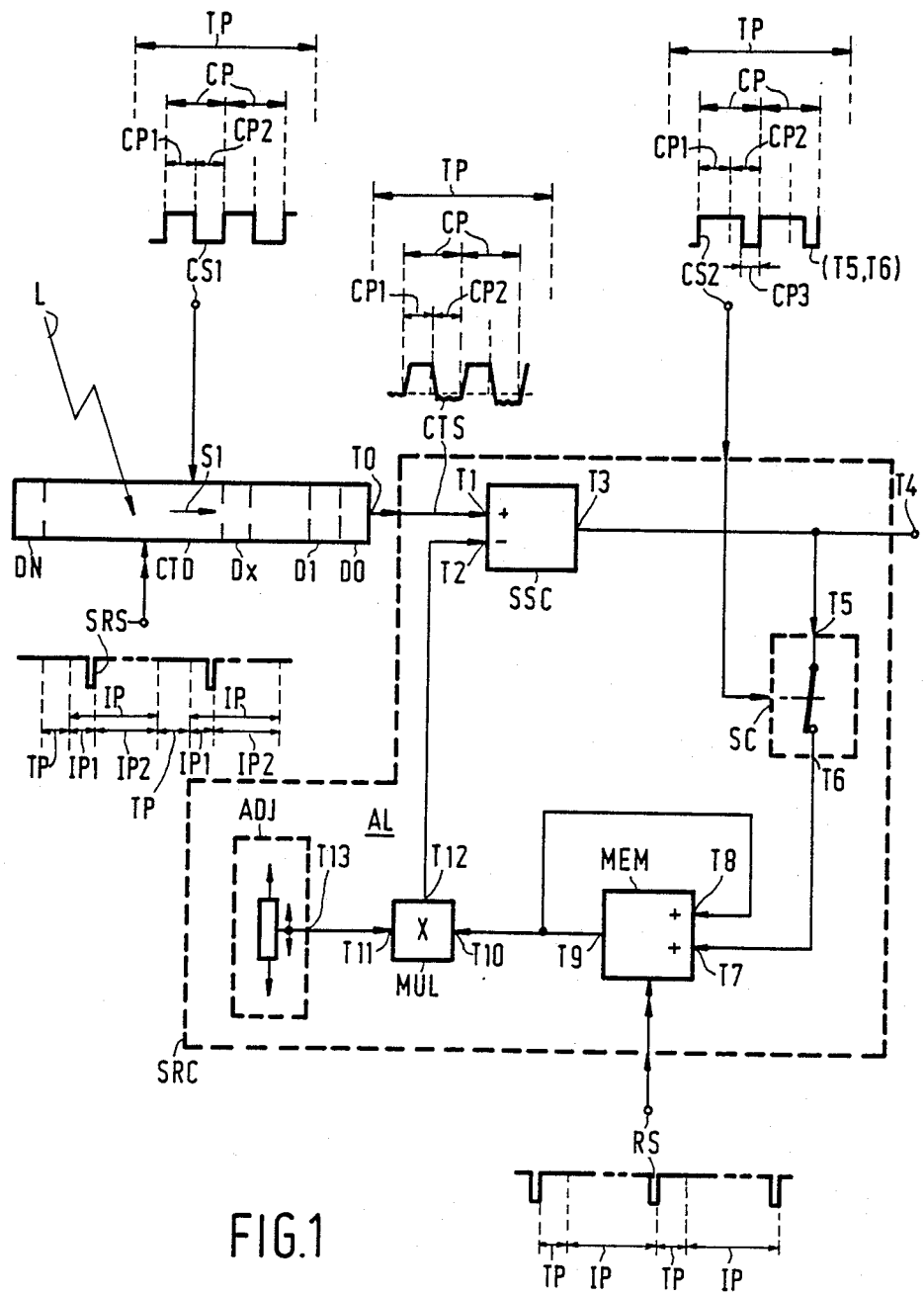

United States Patent [19]

Mulder

[11] Patent Number: 4,864,407
[45] Date of Patent: Sep. 5, 1989

[54] PICK UP DEVICE HAVING PICK UP ELEMENTS ARRANGED IN A PREDETERMINED PATTERN AND SMEAR COMPONENT REDUCTION VARYING INDEPENDENCE UPON THE POSITION OF A PICK UP ELEMENT IN THE PATTERN

[75] Inventor: Jakob W. Mulder, Eindhoven, Netherlands

[73] Assignee: U.S. Philips Corporation, New York, N.Y.

[21] Appl. No.: 161,548

[22] Filed: Feb. 29, 1988

[30] Foreign Application Priority Data

Mar. 5, 1987 [NL] Netherlands ............... 8700529
Jul. 2, 1987 [NL] Netherlands ............... 8701552

[51] Int. Cl.$^4$ ............... H04N 5/335; H04N 3/15
[52] U.S. Cl. ............... 358/213.24; 358/213.25
[58] Field of Search ............... 358/213.24, 213.23, 358/213.31, 213.25

[56] References Cited

U.S. PATENT DOCUMENTS 4,581,651 4/1986 Miyata et al. ............... 358/213.24
4,742,396 5/1988 Bell ............... 358/213.24

FOREIGN PATENT DOCUMENTS 211385 11/1984 Japan .

Primary Examiner—James J. Groody
Assistant Examiner—Robert M. Bauer
Attorney, Agent, or Firm—Marianne R. Rich; Algy Tamoshunas

[57] ABSTRACT

A sensor (CTD) which is formed with pick-up elements (D) for converting incident radiation (L) into electric charge packets which can be shifted to a sensor signal output (TO) through sensor elements under the control of clock pulse signals (CS1) may be beset with unwanted signal smear caused by the shifting process. To eliminate this, the relevant pick-up device includes a signal smear reduction circuit (SRC) which is specifically operative for a smear component produced during instantaneous shifting after a radiation information integration period. To this end, the signal smear reduction circuit (SRC) includes a signal subtraction circuit (SSC) which has an input (T1) coupled to the sensor signal output (TO), an output (T3) being coupled to an output (T4) of the pick-up device for the supply of an output signal with reduced signal smear and to an input (T5) of a series circuit (MEM, MUL, SC) comprising at least a summing memory device (MEM) and a signal attenuation circuit (MUL), whilst a series circuit output (T12) is coupled to another input (T2) of the signal subtraction circuit (SSC). A signal switching device (SC) which forms part of the series circuit (MEM, MUL, SC) of which is present between the sensor signal output (TO) and the input (T1) of the signal subtraction circuit (SSC) switches periodically on and off at a clock pulse frequency (1/CP) which is associated with the signal supply to the signal smear reduction circuit (SRC) and the summing memory device (MEM) has a reset (RS) which is operative before the signal supply to the signal smear reduction circuit (SRC) commences.

12 Claims, 3 Drawing Sheets

PICK UP DEVICE HAVING PICK UP ELEMENTS ARRANGED IN A PREDETERMINED PATTERN AND SMEAR COMPONENT REDUCTION VARYING INDEPENDENCE UPON THE POSITION OF A PICK UP ELEMENT IN THE PATTERN

The invention relates to a pick-up device including a solid-state radiation sensor and a signal smear reduction circuit, in which the sensor comprises pick-up elements for converting incident radiation into electric charge packets which can be shifted through sensor elements to a sensor signal output under the control of clock pulse signals, the signal smear reduction circuit coupled to the sensor signal output comprising a signal memory device, a signal subtraction circuit and a signal switching device, the signal subtraction circuit having an output for the supply of an output signal with reduced signal smear.

A pick-up device of this type particularly for use in television is described in U.S. Pat. No. 4,567,524. In this device the sensor sensitive to light as radiation operates as a so-called frame transfer device and is in the form of a charge-comprised device. The sensor is coupled of pick-up elements arranged in rows and columns and identically arranged storage elements and a parallel-in, series-out shift register coupled thereto both of which are shielded from light. A shift register output constitutes the sensor signal output. The frame transfer is effected columnwise from a sensor part thus composed with the pick-up elements to a shielded, similarly composed sensor part with the storage elements. Since the radiation conversion continues in the pick-up elements during the periodical frame transfer, the sensor output signal comprises a signal smear component.

If the sensor is formed with a single row or column of pick-up elements, in which the radiation conversion continues at the pick-up elements during shifting the charge packets therein, a signal smear component is also present in the sensor output signal.

In both cases the signal smear component in the sensor output signal comprises two sub-components, namely one smear component before integration and one smear component after integration. The smear component before integration is present in the pick-up elements after the information has been shifted from all pick-up elements. Subsequently, the incident light radiation is converted into the charge packets during an information integration period. Then the resultant charge packets are shifted through the pick-up elements in a subsequent information shift period and the smear component after integration is generated by the continuing integration. In this connection the terms before integration and after integration refer to the said information integration period.

According to the said patent, to be able to perform the signal smear reduction use is made of a longer continuing frame transfer than is required for transferring the information which is picked up. Consequently, the sensor pick-up member is operative, as it were, with at least one "empty" row of pick-up elements from which only the smear information emanates which comprises only the smear component after integration.

In the said sensor design with the single pick-up element row or column, the further shifting is effected from at least one single "empty" pick-up element and the smear component after integration is also obtained.

During the longer lasting shift the smear component after integration is applied via the switching device in the form of a change-over device to the memory device and the pick-up information with the inherent smear before and after integration is applied to an input of the signal subtraction circuit, another input of which has the output of the signal memory device connected to it. Consequently, the output of the signal subtraction circuit conveys the output signal with reduced signal smear.

It appears that when performing the signal smear reduction, one given sample is taken of the smear component after integration, which sample is subsequently used repeatedly. In the sensor described with the frame transfer the sample is associated with a row of pick-up elements and in the sensor row design it s associated with one pick-up element. Since the value of the smear component after integration is dependent on the position of the pick-up element in the column or in the row through which the charge packets are shifted, the reduction result is a compromise If an average value is taken for the sample value, the smear reduction is too large for a part of the pick-up elements and too small for the other part.

It is an object of the invention to realize a pick-up device in which the smear component after integration is reduced in dependence upon the position of the pick-up element in the column or the row. To this end a pick-up device according to the invention is characterized in that the sensor signal output is coupled to a first input of the signal subtraction circuit whose output is coupled to an output of the pick-up device and to an input of a series circuit comprising the signal memory device in the form of a summing memory device and a signal attenuation circuit, an output of said series circuit being coupled to a second input of the signal subtraction circuit, the signal switching device present in the series circuit or in the coupling between the sensor signal output and the first input of the signal subtraction circuit switching periodically on and off at a clock pulse frequency which is associated with the signal supply to the signal smear reduction circuit and the summing memory device being formed with a reset which is operative before the signal supply to the signal smear reduction circuit commences.

Due to the signal processing described not only the position of the pick-up element in the column or row, but also the size of the charge packets obtained by the light integration is taken into account for the smear reduction. A stronger smear reduction is present at the signals which have been subject of more shifts to the sensor signal output and at the signals subsequent to larger charge packets.

A pick-up device including a two-dimensional sensor comprising a pick-up member with pick-up elements arranged in rows and columns, a storage member coupled thereto with storage elements arranged in rows and columns and a parallel-in, series-out shift register member coupled thereto, in which the charge packets can be shifted to the shift register member in the column direction of the pick-up and storage elements is characterized in that the signal smear reduction circuit is present per column in the couplinq between the pick-up member and the shift register member.

Another embodiment of the pick-up device in which the sensor described with pick-up, storage and shift register members is present, is characterized in that the summing memory device of the signal smear reduction circuit is formed with a signal delay device and a signal adder circuit, an output and an input of the adder circuit being coupled to an input and an output, respectively, of the delay device and the delay period of the signal delay device being essentially equal to one shift period plus one signal blanking period in the sensor shift register member associated with the signal supply to the signal smear reduction circuit.

A pick-up device in which not only the smear component after integration but also the smear component before integration is reduced and in which an electronic shutter may be present for setting a desired information integration period is characterized in that the sensor is formed with a reset which is operative after the signal supply to the signal smear reduction circuit has discontinued.

A resetting immediately and always after the signal supply has discontinued leads to the removal of only the smear component before integration. A resetting after the signal supply at a variable instant which is dependent on the intensity of exposure at the pick-up elements additionally provides for the electronic shutter action.

An embodiment of the pick-up device including a simple signal attenuator is characterized in that the signal attenuation circuit is formed as a multiplier circuit to which an adjusting circuit for the supply of an adjustable multiplication factor is coupled.

Figure 2:
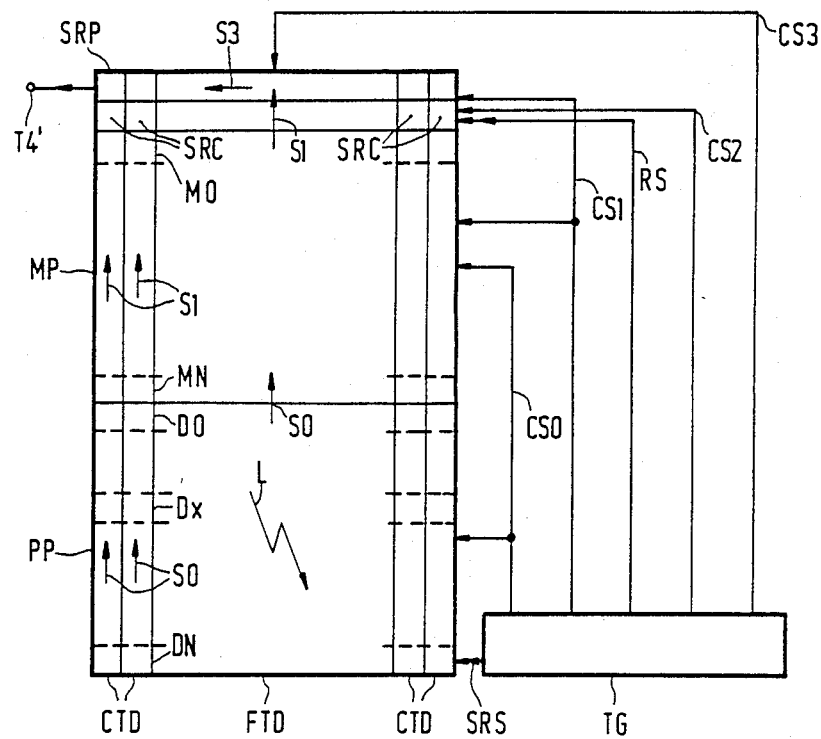
Figure 3:
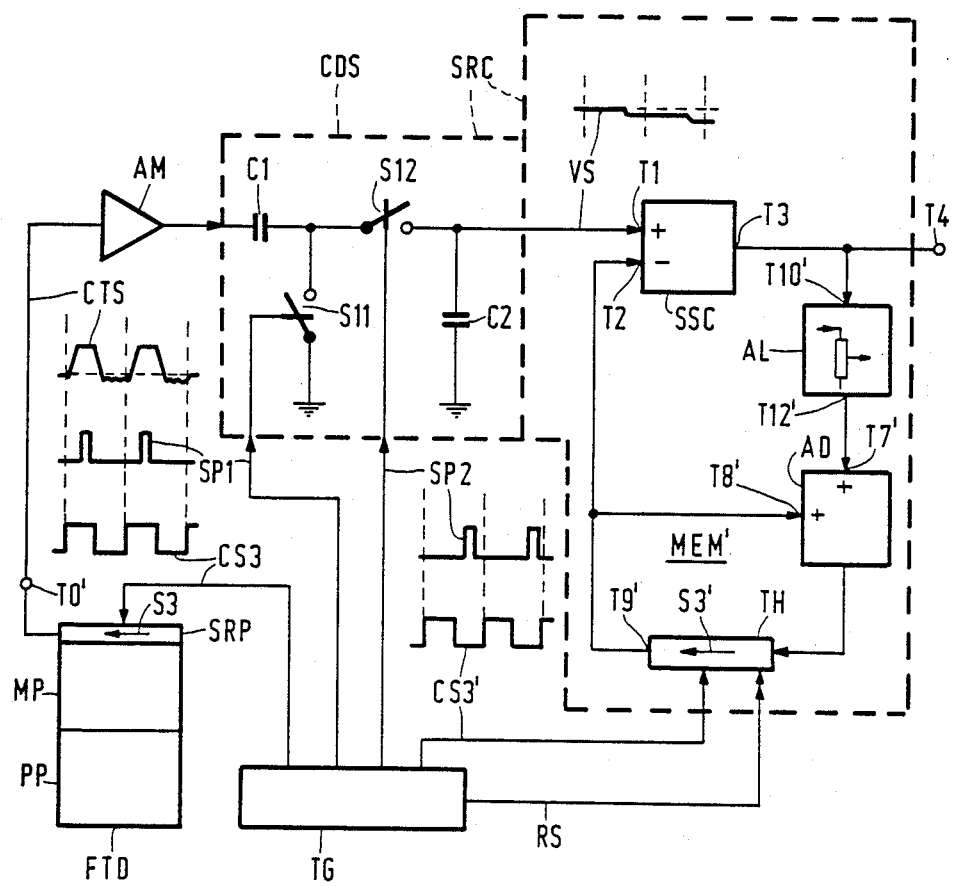

The invention will now be described in greater detail with to the accompanying drawings, in which FIG. 1 shows an embodiment of a pick-up device according to the invention with a row sensor and an embodiment of the signal reduction circuit in a block diagram, FIG. 2 shows another embodiment of a pick-up device according to the invention with a two-dimensional sensor formed with elements arranged in rows and columns and a signal circuit per column, and FIG. 3 shows for the two-dimensional sensor a single signal smear reduction circuit with a specific embodiment of a summing memory device.

In FIG. 1 the reference CTD denotes a row sensor with pick-up elements D0, D1, ... Dx, ... DN. The sensor CTD is in the form of a charge transfer device and operates, for example, as a charge-coupled device. In the pick-up elements D incident radiation denoted by L is converted into electric charge packets. The radiation L is, for example, visible light radiation, but it may be alternatively X-ray, ultra-violet, infrared or any other radiation. The incident radiation is converted into the charge packet in an information integration period. After this period the charge packets which are present in the pick-up elements D and whose sizes are dependent on the local radiation intensity and the integration period are shifted to a sensor signal output TO. The reference S1 denotes an arrow indicating the shift direction. The charge packets are shifted under the control of clock pulse signals CS, of which a signal variation is shown as a function of time at an input terminal CS1 in FIG. 1 for the purpose of illustration. FIG. 1 shows further signals shown as a function of time, which signals are denoted by CS1, CTS, SRS and RS. The clock pulse signal CS1 occurring at the terminal which is denoted identically, is shown with clock pulse periods CP. The references CP1 and CP2 denote first and second parts of a period, which as shown may have the same duration. As is illustrated, it is assumed that the clock pulse signal CS1 occurs during an information shift period TP. An effective information integration period precedes the shift period TP, which is illustrated in FIG. 1 by means of a period IP2 at the signal SRS. The effective information integration period IP2 together with a period IP1 before integration constitutes an integration period IP. The various periods are shown at a terminal SRS by means of the identically denoted signal. The signal SRS is a reset signal having a reset pulse just before the effective integration period IP2. Resettings are denoted by double arrow heads at signal leads. The instants of the reset pulse are variable if the sensor CTD operates with an electronic shutter. Instead of the short lasting reset pulse shown, a pulse may be present having a leading edge contiguous to the shift period TP and a trailing edge at a variable instant. If the short lasting reset pulse shown occurs continuously to the shift period TP, for which it holds that IP1 = 0 and IP = IP2, there is no electronic shutter action. The resetting with the reset signal SRS only ensures the removal of the smear component before integration described hereinbefore. For both cases it holds that the sensor CTD is formed with a reset (SRS) which is operative after the signal supply to the signal smear reduction circuit SRC has discontinued.

In FIG. 1 the output signal is denoted by CTS at the sensor signal output TO. During the first parts CP1 of the period a signal reference level is present in the signal CTS, with respect to which level the signal level in the second part CP2 of a period supplies the information associated with the size of the charge packet which has been shifted through the sensor CTD. The Figure shows an increasing level difference associated with charge packets increasing in size.

As described, the shifting of the charge packets through the sensor CTD, while the incident radiation L is present, results in a signal smear component occurring in the signal CTS during the second part CP2 of a period. If the resetting is effected with the reset signal SRS shown, there is no smear (sub)component before integration. For reducing the smear component after integration which is present, the sensor signal output TO is coupled to a signal smear reduction circuit SRC according to the invention and to a first input T1 therein of a signal subtraction circuit SSC. The circuit SSC is shown with the (+) input T1, a (−) input T2 and an output T3 which is coupled to an output T4 of the pick-up device for the supply of an output signal with reduced signal smear, and to an input T5 of a switching device SC. The input T5 is also the input of a series circuit further comprising a signal memory device MEM and a signal attenuation circuit MUL. To emphasize that the components in the series circuit may be present in a sequence which is different from the sequence shown, the series circuit is denoted by (MEM, MUL, SC).

The switching device SC has an output T6 and a switching signal input which is connected to a terminal CS2 at which the identically denoted clock pulse signal is shown. During the second part CP2 of the period the signal CS2 shows a pulse occurring at the end with a third period part CP3. The reference (T5, T6) denotes a pulse level at which the switching device SC is considered to be switched on. The third period part CP3 may occur at an arbitrary part of the second period part CP2. The signal CS2 illustrates that the switching device SC periodically switches on and off during the shift period TP at a clock pulse frequency 1/CP which is associated with the signal supply to the signal smear reduction circuit SRC.

The output T6 of the switching device SC is connected to an input T7 of the signal memory device MEM which has also an input T8 and an output T9 which is coupled to the input T8 and to an input T10 of the signal attenuation circuit MUL. The symbol + at the two inputs T7 and T8 indicates that the device MEM is in the form of a summing memory device. The device MEM has a reset via a terminal TS, connected to a reset input, at which terminal the identically indicated reset signal is shown. The signal RS has a reset pulse before the shift period TP. The Figure shows a reset pulse just preceding the period TP. Instead, the reset pulse in the signal RS may occur at any arbitrary instant during the integration period IP. It is essential that the resetting (RS) of the memory device MEM is operative before the signal supply to the signal smear reduction circuit SRC commences, hence before the shift period TP. The memory device MEM which is shown in the form of a summing memory device provided with a a reset is identical in operation to a signal integration circuit provided with a reset, so that both descriptions can be used.

The signal attenuation circuit MUL has a further input T11 and an output T12. The input T11 is coupled to an output T13 of an adjusting circuit ADJ.wich is suitable for the supply of an adjustable multiplication factor to the input T11 of the multiplier circuit (MUL, X) shown by way of example. The adjusting circuit ADJ is illustrated with a potentiometer, an adjustable tapping of which is connected to the output T13. The output T12 of the circuit MUL constitutes the output of the series circuit (MEM, MUL, SC) which is coupled to the second input T2 of the signal subtraction circuit SSC. The reference AL denotes the combination of the circuits ADJ and MUL for the signal attenuation.

To explain the operation of the signal smear reduction circuit SRC according to the invention, the following applies. It is assumed that the smear component before integration is either absent or negligible after removal or reduction by means of appropriate measures. As far as the smear component after integration in the sensor output signal CTS is concerned, it applies that it is nil at the information or, in other words, the charge packet from the pick-up element DO and is maximum due to the maximum number of N shifts from the pick-up element DN. In fact, the charge packet generated in the element DO is not shifted through another element but is immediately shifted out to the output TO. Generally it applies that for the element Dx with x between 0 and N, the smear component after integration is proportional to x in connection with the position in the row sensor CTD. By subtracting in fraction of the summed output signal, which is obtained during the second period parts CP2, from the signal CTS via the series circuit (MEM, MUL, SC), the position-dependent smear reduction after integration is obtained. In addition the value of the fraction of the summed output signal for the subtraction is determined by the value of the sensor output signal CTS, that is to say, by the size of the charge packets obtained by radiation integration. Consequently, a stronger smear reduction is obtained at the signal values succeeding larger charge packets. A "streak" behind such a large charge packet is also reduced by the signal smear reduction circuit SRC. The result is that the output T4 of the pick-up device supplies an output signal with an optimally reduced signal smear.

As regards the value of the fraction of the summed output signal is to be noted that it is dependent on the effective information integration period, the shift period and the number of the elements in the sensor CTD. The fraction is in this case equal to the quotient of the shift period TP and of the product of the effective integration period IP2 and the number of (N+1) elements. It appears that in the case of a variable effective integration period IP2, as is present in the case of an electronic or mechanical shutter, the fraction must be adapted, which can be effected simply by adapting the adjusting circuit ADJ to the variation of the integration period.

It is to be noted for the sake of completeness that the smear component before integration is maximum at the pick-up element DO and minimum at the pick-up element DN. In fact, in the row sensor CTD the charge packets are shifted in the direction S1, so that the pick-up element DN which is first "empty" is shifted, as it were, in the shift period TP to the pick-up element DO which is last "empty".

Instead of an on-off switch, the switching device SC may be in the form of a change-over device SC' having an input T5 and two outputs T4 and T6. The signal CS2 may be unmodified in this case. The result would be that during resetting via the series circuit (MEM, MUL, SC') the output T4 is free from the output T3. Further it applies that the switching device SC, although shown with a mechanical switch, will be formed with electronic components, whilst the same applies to the change-over device SC'.

If it is advantageous to give the signal smear reduction circuit SRC a fully or partly digital form, particularly forming the summing memory device MEM as a digital memory, use can be made of an analog-to-digital conversion before or in the signal smear reduction circuit SRC. Also in the case of the digital form of the device MEM a resettable signal integration circuit is concerned.

FIG. 2 shows diagrammatically an embodiment of a frame transfer sensor FTD comprising a pick-up member PP, a storage member MP and a parallel-in, series-out shift register member SRP, both of which are shielded from the light radiation L. The reference T4' denotes the output of the pickup device according to FIG. 2. References shown in FIG. 1 are also shown identically or in a modified form in FIG. 2. The pick-up member PP and the storage member MP comprise sensor element DO .. Dx .. DN and MO .. MN, respectively, arranged in rows and columns. At the pick-up member PP the reference CTD denotes the columns of the sensor FTD which correspond to the row sensor CTD of FIG. 1. The direction of shifting through the columns and from the pick-up member PP to the storage member MP is denoted by arrows SO. This parallel shift is effected under the control of clock pulse signals CSO from a time signal generator TG. A parallel shift to the shift register member SRP in the direction of the arrow S1 is effected under the control of clock pulse signals CS1 from the columns with storage elements MO .. MN. Clock pulse signals CS3 ensure a serial shift in a direction of the arrow S3 to the output T4'.

In accordance with an aspect of the invention, a signal smear reduction circuit SRC is present per column in the coupling between the pick-up member PP and the shift register member SRP, and more specifically in accordance with FIG. 2 between the storage member MP and the shift register member SRP. The signals CS2 and RS are supplied by the generator TG to the circuits SRC for switching on and off the switching device SC and for resetting the summing memory device MEM, as is shown in detail in FIG. 1.

It is to be noted that the signal supply to the signal smear reduction circuits SRC of FIG. 2 is effected from the columns of the storage member MP, so that switching on and off under the control of the signal CS2 and memory resetting under the control of the signal RS are directly dependent on the control mode of the storage member MP via the clock pulse signals CS1.

If the signal smear reduction circuits SRC are present between the pick-up member PP and the storage member MP, it applies that the sensor columns CTD as shown for the row sensor in FIG. 1 are controlled by the clock pulse signals CS1 with the associated shift arrows S1.

The signal smear reduction circuits SRC may be incorporated together with the described sensor members PP, MP and SRP in one integrated circuit which may furthermore include the time signal generator TG.

FIG. 2 shows specifically the frame transfer sensor FTD for the two-dimensional sensor design. In this case the signal smear reduction is essential. If a so-called interline sensor is concerned in which shielded memory element columns are present as the teeth of a comb construction at the shielded shift register member and the pick-up elements located between the teeth each have their own coupling to an adjacent, associated storage element, the signal smear reduction is of less importance. However, signal smear does occur in practice. Here again the signal smear reduction circuit SRC described in detail with reference to FIG. 1 can be used per column for the smear component after integration.

FIG. 3 shows an embodiment of a picture pick-up device according to the invention in which the known frame transfer sensor FTD is used without adaptation for the signal smear reduction. The embodiment shown in FIG. 3 can also be used with an interline sensor. References already indicated in FIGS. 1 and 2 are given with primed or non-primed references in FIG. 3. In FIG. 3 one clock pulse signal of the, for example, three-phase clock signals CS3 is shown, for which the same references are used as those given in FIG. 1 for the clock pulse signals CS1. The clock pulse signals CS3 provide for the serial information shift denoted by the arrow direction S3 in the sensor shift register member SRP to the sensor output TO' for the supply of the output signal CTS. The output TO' is coupled to an input of an amplifier AM, an output of which is coupled to an input of the signal smear reduction circuit SRC. The reference CDS denotes a signal switching device which is present between the sensor signal output TO' and the (+) input T1 of the signal subtraction circuit SSC. The output of the amplifier AM is coupled to ground via a capacitor C1 and a switch S11. A switching signal SP1 is applied from the generator TG to the switch S11 in the form of a switching transistor. The switch S11 and the capacitor C1 operate as a signal clamping circuit (S11, C1) under the control of the clamping signal SP1. A switch S12 coupling the junction point of the capacitor C1 and the switch S11 via a capacitor C2 to ground succeeds the signal clamping circuit (S11, C1). A switching signal SP2 is applied from the generator to the switch S12 in the form of a switching transistor. The switch S12 and the capacitor C2 operate as a signal sample and hold circuit (S12, C2) under the control of the sampling signal SP2. The junction point of the switch S12 and the capacitor C2 is connected to the (+) T1 of the circuit SSC, which receives a picture signal VS shown at this circuit. The picture signal VS is obtained in the manner described via the so-called correlated double sampling with the successively occurring pulses in the signals SP1 and SP2. The output T3 coupled to the output T4 of the pick-up device is connected to an input T10' of a signal attenuation circuit AL, an output T12' of which is connected to an input T7' of a signal adder circuit AD. At the signal attenuation circuit AL a potentiometer shown illustrates the signal attenuation which can be further obtained in the manner shown in, for example, FIG. 1. An output of the circuit AD is connected to an input of a signal delay device TH an output T9' of which is connected to the (−) input T2 of the circuit SSC and to an input T8' of the circuit AD. The signal delay device TH and the signal adder circuit AD jointly constitute a summing memory device MEM' which is present in a series circuit (MEM', AL). FIG. 3 shows an example of multi-phase clock pulse signals CS3' in which the signal delay device TH has a signal shift denoted by an arrow direction S3'. The references S3 at the sensor shift register member SRP and S3' at the signal delay device illustrate that the delay period (TH) is essentially equal to the shift period plus a signal blanking period in the member SRP, more specifically being equal to one television line period if the sensor FTD operates for television. The synchronism at the signal shift in the shift register SRP and the delay device TH should have an accuracy up to one pixel period, or in other words the clock pulse period. In addition to the clock pulse signals CS3', the generator TG also applies the reset signal RS to the signal delay device TH. As is described with reference to FIG. 1 it also applies to FIG. 3 that the attenuation circuit AL and the memory device MEM' may be operative in the analogue or the digital mode.

The signal switching device SC of FIG. 1 and the signal switching device CDS of FIG. 3 have the same function, namely ensuring that the picture signal values can influence the signal smear reduction and that the reset level which may have a variation, cannot influence the signal smear reduction. To this end the signal switching device SC is present in the series circuit (MEM, MUL., SC) or the signal switching device CDS is present in the coupling between the sensor signal output TO' and the input T1 of the signal subtraction circuit SSC.

What is claimed is:

1. A pick-up device including a solid-state radiation sensor and a signal smear reduction circuit, in which the sensor comprises pick-up elements for converting incident radiation into electric charge packets which can be shifted through sensor elements to a sensor signal output under the control of clock pulse signals, the signal smear reduction circuit coupled to the sensor signal output comprising a signal memory device, a signal subtraction circuit and a signal switching device, the signal subtraction circuit having an output for the supply of an output signal with reduced signal smear, characterized in that the sensor signal output is coupled to a first input of the signal subtraction circuit whose output is coupled to an output of the pick-up device end to an input of a series circuit comprising the signal memory device in the form of a summing memory device and a signal attenuation circuit, an output of said series circuit being coupled to a second input of the signal subtraction circuit, the signal switching device, present in the series circuit or in the coupling between the sensor signal output and the first input of the signal subtraction circuit, switching periodically on and off at a clock pulse frequency which is associated with the signal supply to the signal smear reduction circuit and the summing memory device being formed with a reset which is operative before the signal supply to the signal smear reduction circuit commences, wherein the sensor is formed with another reset which is operative after the signal supply to the signal smear reduction circuit has been discontinued.

2. A pick-up device according to claim 1, wherein the signal attenuation circuit is formed as a multiplier circuit to which an adjusting circuit for the supply of an adjustable multiplication factor is coupled.

3. A pick-up device including a solid-state radiation sensor and a signal smear reduction circuit, in which the sensor comprises pick-up elements for converting incident radiation into electric charge packets which can be shifted through sensor elements to a sensor signal output under the control of clock pulses signals, the signal smear reduction circuit coupled to the sensor signal output comprising a signal memory device, a signal subtraction circuit and a signal switching device, the signal subtraction circuit having an output for the supply of an output signal with reduced signal smear, where the sensor signal output is coupled to a first input of the signal subtraction circuit whose output is coupled to an output of the pick-up device and to an input of a series circuit comprising the signal memory device in the form of a summing memory device and a signal attenuation circuit, an output of said series circuit being coupled to a second input of the signal subtraction circuit, the signal switching device, present in the series circuit or in the coupling between the sensor signal output and the first input of the signal subtraction circuit, switching periodically on and off at a clock pulse frequency which is associated with the signal supply to the signal smear reduction circuit and the summing memory device being formed with a reset which is operative before the signal supply to the signal smear reduction circuit commences, wherein the signal attenuation circuit is formed as a multiplier circuit to which an adjusting circuit for the supply of an adjustable multiplication factor is coupled.

4. A pick-up device according to claim 3, wherein the sensor is formed with a reset which is operative after the signal supply to the signal smear reduction circuit has been discontinued.

5. A pick-up device including a solid-state radiation sensor and a signal smear reduction circuit, in which the sensor comprises pick-up elements for converting incident radiation into electric charge packets which can be shifted through sensor elements to a sensor signal output under the control of clock pulse signals, the signal smear reduction circuit coupled to the sensor signal output comprising a signal memory device, a signal subtraction circuit and a signal switching device, the signal subtraction circuit having an output for the supply of an output signal with reduced signal smear, where the sensor signal output is coupled to a first input of the signal subtraction circuit whose output is coupled to an output of the pick-up device and to an input of a series circuit comprising the signal memory device in the form of a summing memory device and a signal attenuation circuit, an output of said series circuit being coupled to a second input of the signal subtraction circuit, the signal switching device, present in the series circuit or in the coupling between the sensor signal output and the first input of the signal subtraction circuit, switching periodically on and off at a clock pulse frequency which is associated with the signal supply to the signal smear reduction circuit and the summing memory device being formed with a reset which is operative before the signal supply to the signal smear reduction circuit commences, wherein
the pick-up device is formed with a sensor comprising a pick-up member having said pick-up elements arranged in rows and columns, a storage member coupled thereto with storage elements arranged in rows and columns and a parallel-in, series-out shift register member coupled thereto, in which the charge packets can be shifted to the shift register member in the column direction of the pick-up and storage elements, and wherein each column includes its own said signal smear reduction circuit coupling the pick-up member and the shift register member.

6. A pick-up device as claimed in claim 5, characterized in that the sensor is formed with a reset which is operative after the signal supply to the signal smear reduction circuit has been discontinued.

7. A pick-up device according to claim 6, wherein the signal attenuation circuit is formed as a multiplier circuit to which an adjusting circuit for the supply of an adjustable multiplication factor is coupled.

8. A pick-up device as claimed in claim 5, characterized in that the signal attenuation circuit is formed as a multiplier circuit to which an adjusting circuit for the supply of an adjustable multiplication factor is coupled.

9. A pick-up device including a solid-state radiation sensor and a signal smear reduction circuit, in which the sensor comprises pick-up elements for converting incident radiation into electric charge packets which can be shifted through sensor elements to a sensor signal output under the control of clock pulse signals, the signal smear reduction circuit coupled to the sensor signal output comprising a signal memory device, a signal subtraction circuit and a signal switching device, the signal subtraction circuit having an output for the supply of an output signal with reduced signal smear, where the sensor signal output is coupled to a first input of the signal subtraction circuit whose output is coupled to an output of the pick-up device and to an input of a series circuit comprising the signal memory device in the form of a summing memory device and a signal attenuation circuit, an output of said series circuit being coupled to a second input of the signal subtraction circuit, the signal switching device, present in the series circuit or in the coupling between the sensor signal output and the first input of the signal subtraction circuit, switching periodically on and off at a clock pulse frequency which is associated with the signal supply to the signal smear reduction circuit and the summing memory device being formed with a reset which is operative before the signal supply to the signal smear reduction circuit commences, wherein
the pick-up device is formed with a sensor comprising a pick-up member having said pick-up elements arranged in rows and columns, a storage member coupled thereto with storage elements arranged in rows and columns and a parallel-in, series-out shift register member coupled thereto, in which the charge packets can be shifted to the shift register member in the column direction of the pick-up and storage elements, and wherein the summing memory device of the signal smear reduction circuit is formed with a signal delay device and a signal adder circuit, an output and an input of the adder circuit being coupled to an input and and output respectively, of the delay device and the delay period of the signal delay device being substantially equal to one shift period plus one signal blanking period in the sensor shift register member associated with the signal supply to the signal smear reduction circuit.

10. A pick-up device according to claim 9, wherein the signal attenuation circuit is formed as a multiplier circuit to which an adjusting circuit for the supply of an adjustable multiplication factor is coupled.

11. A pick-up device according to claim 10, wherein the sensor is formed with a reset which is operative after the signal supply to the signal smear reduction circuit has been discontinued.

12. A pick-up device according to claim 9, wherein the sensor is formed with a reset which is operative after the signal supply to the signal smear reduction circuit has been discontinued.

* * * * *